Dec. 19, 1950 J. T. HECK ET AL 2,534,552
PORTABLE PROJECTION PICTURE SCREEN SUPPORT
Filed Oct. 25, 1947 2 Sheets-Sheet 2
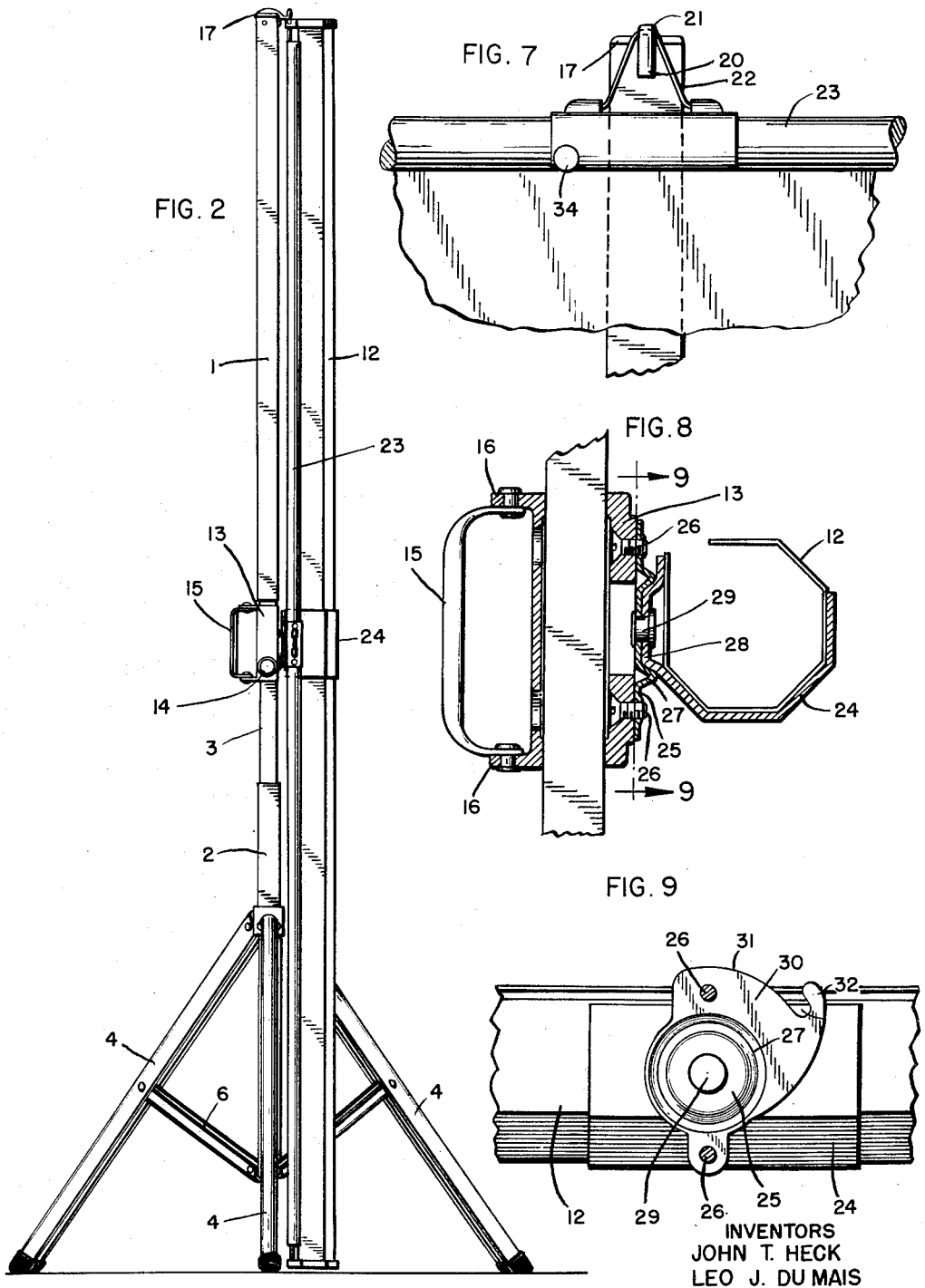
INVENTORS
JOHN T. HECK
LEO J. DU MAIS
CURTIS O. TALBOT
BY
ATTORNEYS Patented Dec. 19, 1950

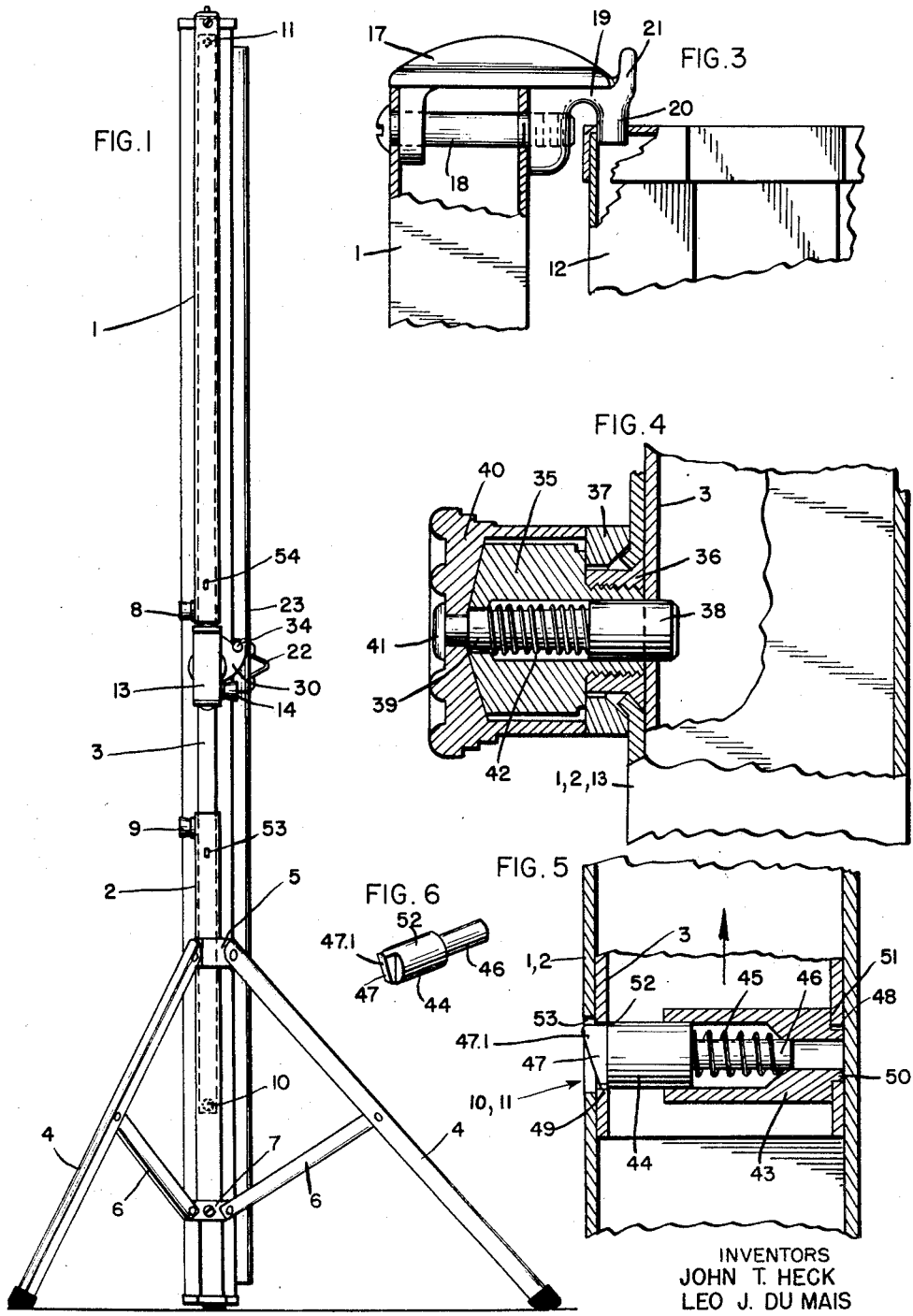

2,534,552

UNITED STATES PATENT OFFICE 2,534,552

PORTABLE PROJECTION PICTURE SCREEN SUPPORT

John T. Heck, Elmhurst, and Leo J. Du Mais and Curtis O. Talbot, Chicago, Ill., assignors to Da-Lite Screen Company, Inc., Chicago, Ill., a corporation of Illinois Application October 25, 1947, Serial No. 782,202

7 Claims. (Cl. 160—24)

This invention relates to improvements in collapsible portable screens for projected pictures and particularly to an improved portable screen-stand assembly and combination.

The main objects of this invention are to provide an improved collapsible portable picture screen; to provide such a device having improvements and refinements of construction details and operation; to provide such a device that can be more easily erected by the user; to provide an improved portable picture screen which may be easily and quickly adjusted to vary the screen's size and shape from the conventional oblong form to a square form; to provide an improved collapsible picture screen stand wherein the shiftable elements are more firmly locked in position when the screen is erected; and to provide, in combination, an improved collapsible picture screen stand having novel means for operating the extensible stand elements and for supporting and operating the screen casing.

A specific embodiment of this invention is shown in the accompanying drawings wherein:

Figure 1 is a rear view in elevation showing the improved screen in the first position of erection and with the screen casing locked in vertical position parallel with the stand.

Fig. 2 is a vertical side elevation of the same.

Fig. 3 is a fragmentary detailed view partly in section showing the manner in which the screen casing is engaged by the top cap of the stand when locked in vertical position.

Fig. 4 is a fragmentary sectional view showing details of an improved locking pin for the telescoping stand elements and rider member.

Fig. 5 is a fragmentary sectional view showing the arrangement of an improved automatic stop latch for either end of the telescoping stand center element, the arrow showing the direction of relative movement of the center element during extension. The view is to be considered as upside down for showing the upper end of the center stand element.

Fig. 6 is a perspective view of the latch pin employed in the device shown in Fig. 5.

Fig. 7 is a fragmentary view in front elevation showing the manner in which the top slat or pull frame of the screen is hung on the top cap of the screen stand when the screen is unrolled for use.

Fig. 8 is a vertical sectional view showing details of the center handle or rider which carries the screen casing, the screen casing being shown in horizontal position, and Fig. 9 is a sectional view as taken on line 9—9 of Fig. 8 to show the centering bracket for the screen casing for locating the screen casing in vertical position parallel to the screen stand.

As shown in the drawings, the improved portable picture screen comprises a vertical stand having a plurality of telescoping members, the lower one of which is provided with a foldable tripod base for holding the stand erect, the telescoping elements being extensible above the tripod base to support a picture screen at the desired elevation.

In the form shown, the stand includes upper and lower tubular members 1 and 2 respectively and a center member 3 which is slidably disposed within the members 1 and 2 in telescoping relation. The lower member or bottom tube 2 carries the tripod base which comprises three legs 4 having their upper ends pivotally connected to a collar 5, slidable along the outside of the bottom tube 2, and being pivotally connected near their center to folding arms 6 which in turn are pivotally connected to a fixed collar or bracket 7, located near the lower end of the bottom tube 2. This form of base is old and well known in this art.

The center member 3 is substantially twice the length of the bottom tube 2 and is telescopingly fitted into the bottom tube 2 so as to be slidable therein for extension purposes. The upper or top tube 1 is telescopingly fitted over the upper end of the center member 3 and is slidable thereon and each of the top and bottom tubes is provided with spring locks 8 and 9 respectively (see Fig. 1), which are adapted to engage in suitable apertures in the center member 3 to latch the several tube sections in predetermined extended or collapsed positions.

Details of the spring locks 8 and 9 are shown in Fig. 4, and it will be seen, in Fig. 1, that for convenience of operation the spring lock 8 is located at the lower end of the top tube 1 and the spring lock 9 is located in the upper end of the bottom tube 2. Thus to extend the stand vertically, it is only necessary to release the spring lock 8 and shift the top tube 1 upwardly along the center member 3 until it reaches its uppermost position and then to shift the center member 3 upwardly, by first releasing the spring lock, until it reaches the desired position of extension relative to the bottom tube 2.

In order to limit the relative shifting movement of the telescoping stand elements and prevent their inadvertent disengagement, a pair of automatic stop latches 10 and 11 (see Fig. 1) are provided in the center member 3 at the bottom and top ends respectively, which stop latches automatically engage in suitably located apertures in the bottom tube and top tube respectively to prevent separation of the telescoping elements. Details of the stop latches 10 and 11, which are of identical form, are shown in Fig. 5.

As shown in Figs. 1, 2 and 8, the screen casing 12 is mounted on a combination handle and rider 13 which is slidably fitted on the center member 3, the casing 12 being pivotally connected to the rider 13 so as to be rotatable thereon, in a vertical plane, from vertical to horizontal position. The casing 12 contains the usual spring roller, not shown, on which the screen is wound, the arrangement being such that the screen may be unrolled from the casing for use and then spring wound into the casing when it is desired that the screen be stored.

As shown, the rider 13 is located on the center member 3 between the adjacent ends of the top tube 1 and the bottom tube 2 and is shiftable along the center member 3 to vary its position. A spring lock 14, which is of substantially the same construction as the spring locks 8 and 9, is provided on the rider 13 so that it may be fixed in the desired positions along the center member 3 as will be hereafter explained. Also, the rider 13 is provided with a handle 15, having its ends pivotally connected to suitable ears or lugs 16 extending outwardly from the rider, which handle serves as an operating means for the rider and also as a carrying means when the picture screen and stand are in collapsed or folded position.

As shown in Figs. 3 and 7 and as indicated in Fig. 2, a top cap or bracket 17 is secured on the upper end of the top tube 1 by means of a bolt 18 and this cap 17 is provided with a gooseneck portion 19, having a downwardly projecting pin 20 adapted to engage in an aperture in the end of the screen casing 12 and having an upwardly projecting lug or hook 21. The function of the pin 20 is to engage a suitable hole or opening in the end of the screen casing 12 and lock the casing in a vertical folded position parallel with the stand; and the lug 21 serves as a hook on which the bale 22 of the picture screen top slat 23 is secured when the screen is in extended position.

Referring to Figs. 8 and 9, it will be seen that the screen casing 12 is provided with a center band 24 which is pivotally secured to a supporting plate 25 mounted on the slidable rider 13, the plate 25 being secured to the rider 13 by means of screws 26, which extend outwardly from the inside of the rider. Also the mounting plate 25 is provided with an annular rib 27, forming a socket or concavity in which a boss portion 28, of the screen casing center band 24, seats and is pivotally secured by a rivet 29. Thus, the rib 27 provides a guide for the boss portion 28 when the screen casing is turned on the rivet 29 and tends to stiffen the connection to prevent looseness or wobble of the screen casing.

The mounting plate 25 is also provided, on one side, with an arcuate flange 30 which provides a guide surface 31, concentric with the center of the rivet 29, and a stop or hook 32 which provides a seat 33 to limit the rotating movement of the screen casing as it is turned about the rivet 29 to set the casing in vertical position parallel with the stand. The top slat 23 of the screen is provided with a fixed pin 34, projecting toward the plate 25, for this purpose, so that when the screen is rolled up into the casing 12 and the casing then turned from horizontal to vertical position, the pin 34 will ride on the surface 31 and engage in the seat 33 to positively locate the screen casing in vertical position until it can be secured by means of the lock pin 20 on the cap member 17. The engagement of the pin 34 in the seat 33 also locks the screen top slat 23 against inadvertent pulling of the screen from the casing 12 when the screen and casing are in folded or stowed position.

Details of the spring locks are shown in Fig. 4, the particular spring lock illustrated being the spring lock 9 located at the upper end of the bottom tube 2. As shown, the spring lock comprises a central body member 35 threaded into a nut 36 extending outwardly from the inside of the bottom tube 2. The head of the nut being bevelled and seated in an outwardly flanged opening in the sidewall of the tube 2 so that the head of the nut will be flush with the inner surface of the tube. A washer 37 having its inner margin bevelled inwardly to fit over the outwardly projecting flange, is also provided as a bearing member between the body 35 and the outer sidewall of the tube 2 so that the nut 36 can have sufficient thickness for strength. The body 35 is centrally hollow to provide a housing for the spring actuated pin 38 and the shank 39 of the pin is extended through an end aperture of reduced diameter and through a cap member 40 which fits over the body 35. The end 41 of the shank 39 is then swaged or riveted over to secure the shank to the cap member 40.

The shank 39 is of lesser diameter than the pin 38 and a coiled compression spring 42 is provided on the shank 39 between the pin 38 and the outer end of the pin housing to normally urge the pin 38 inwardly toward the inside of the tube 2. Thus the pin 38 will be automatically forced into any opening in the inner or center member 3 with which it may become aligned.

Referring to Fig. 5, it will be seen that the stop latches are mounted inside of the center member 3, which is shown as a tube, and are arranged to act outwardly therefrom to engage in openings formed in the outer stand members, which slide over the inner member. As shown, the spring latch comprises a hollow cylindrical body 43 adapted to receive a slidable latch pin 44 which is normally urged outwardly from the body 43 by means of a compression spring 45 surrounding a shank portion 46 of reduced diameter. A flat sided pawl or tongue 47 projects from the outer end of the pin 44 and this tongue is of triangular shape, in side elevation, so that one corner 47.1 will project a distance substantially equivalent to the thickness of the sidewalls of tubular center member 3 and the outer tube which slides thereon.

The stop latch is held in place in the center member 3 between diametrically opposed sidewall openings 48 and 49 by means of the end portion 50, which is of reduced diameter, and seats in the round opening 48, and the latch pawl or tongue 47 extends through the opening 49 which is preferably rectangular, the diameter of the body 43 being greater than the opening 48 and the end faces of the pin 44 seating on the margins of the opening 49. The spring latch is thus held in the center member 3 by the action of the coiled compression spring 45 which tends to cause the latch parts to move away from each other.

The triangular shape of the pawl or tongue 47 is such that in one direction it will flatly engage the edge of an opening 53 in the outer tube 2, and in the other direction will be capable of being cammed inwardly by the edge of the opening 53 against the action of the spring 45, the outer face of the tongue 47 being inclined to the axis of the latch pin for this purpose.

In the assembly of the improved screen stand the stop latches are positioned in the center member 3 so as to act in the direction normal to the plane of the picture screen and suitable openings 53 and 54 are provided in the rear wall of the bottom tube and top tube respectively, for engagement of the stop latch tongue 47. The spring locks 8, 9 and 14 are disposed to operate in a direction parallel to the plane of the screen and suitable openings, not shown, in the center member 3 are provided for engagement of the respective pins 38. The stand parts are then assembled so that the center member 3 is telescoped into the bottom tube 2 and the top or upper tube 1 is telscoped over the upper end of the center member 3, the operating handle or rider 13, which carries the screen casing, being disposed on the center member 3 between the top tube and the bottom tube.

When the stand and screen is to be erected, the tripod legs 4 are first spread so that the screen supporting parts stand upright. The top tube 1 is then shifted a short distance upwardly, after first releasing the spring lock 8, so as to disengage the upper end of the screen casing 12 from the pin 20 at the top of the top tube 1. The screen casing is then rotated to horizontal position. The top slat 23 of the screen is then lifted from the screen casing and the bale 22 is hooked over the hook portion 21 of the top cap 17, the top tube having been returned to its lowest position. The screen is now in partially unrolled position exposing substantially one-half of its normal area.

The spring lock 8 is then again released and the top tube 1 is shifted upwardly along the center member 3, by grasping the body of the tube and raising or sliding the same along the center member, until the spring lock 8 is engaged in a suitable side wall aperture located near the top of the center member. The rider 13, being held at its normal centered position on the center member by the spring lock 14, holds the screen casing stationary and the screen thus becomes further unrolled until it is of standard shape, wherein the screen is wider than it is high. From this position, the height or level of the center of the screen above the base can be adjusted by releasing the spring lock 9 in the lower tube and lifting the center member 3 by means of the handle or rider 13 until the center of the screen is at the desired level. The spring lock 9 is then released and engages in a suitable aperture, not shown, in the center member 3 to hold the same in its set position.

If it should be desired to have a screen of square shape, after the level of the screen center has been adjusted, or when the center member is at its maximum height, this can be accomplished by merely releasing the rider stop pin 14 and sliding the rider downwardly, along the center member 3, until the desired vertical length of screen is obtained. At this point the spring lock 14 is again engaged in a suitably located aperture, not shown, in the center member, to lock the rider 13 in the lowered position to which it has been set.

It is to be noted that the stop latches 10 and 11 are designed to automatically limit the maximum extension of the telescoping parts of the stand so as to prevent the parts being inadvertently separated from each other during the raising operation; and that the stop action of these latches is through engagement of the projecting corner portion 47.1 of the respective stop latch pawls or tongues on the edge of the respective rectangular apertures 53 and 54. Hence the stop latch at the bottom of the center member 3 will be positioned so that the corner projection 47.1 of the latching tongue is uppermost; and the stop latch 11 at the top of the center member 3 will be positioned so that its projecting corner 47.1 is lowermost. In each case the stop latches are located so as to operate only after the sliding parts have passed their position of normal maximum extension. Thus in normal operation of the stand the spring locks 8 and 9 will engage before the stop latch operating positions are reached, the stop latches being intended as safety devices in case the spring locks should for any reason fail to operate.

When it is desired to collapse the stand, the rider 13 is first raised or set to its normal or center position on the center member 3 and the spring lock 14 is engaged to hold the rider in place. Then the spring lock 9 is released and the center lember is lowered or shifted downwardly into the bottom tube 2, the operator holding onto the rider to support the vertical load of the screen during this operation. The spring lock 8 is then released and the top tube is lowered manually until it is completely telescoped over the center member, the screen automatically rolling into the casing during this operation.

The bale 22 and the top slat 23 of the screen can now be readily reached to unhook the screen from the hook 21 and to allow it to be completely rolled up into the screen casing 12. When the screen is rolled up the screen casing 12 is rotated to a vertical position, at which point the centering pin 34 on the screen top slat will engage in the hook 33 of the mounting bracket flange 30. The screen casing is thus positively centered and held in vertical position, and the upper or top tube 1 is then lifted manually to bring the pin 20 over the upper end of the screen casing where it can be engaged in the opening provided to receive it. The top tube is then lowered to secure the casing and the tube is locked to the center member by means of the spring lock 8. The screen and casing are thus firmly held in folded vertical position, with the parts safe against inadvertent dislodgement, and the legs 4 may be folded so that the device is ready to be carried by the handle 15 or stowed in a suitable container or storage space.

In folding the stand it is sometimes preferable to collapse the legs 4 before rotating the casing to vertical position, in order to give greater clearance for the bottom end of the casing, in which case the legs are folded immediately after the screen has been unhooked and rolled up. Then the screen casing is turned vertically and secured while the stand is resting on the folded legs.

The main advantages of our improved projection screen reside in the simplicity of its arrangement and its easy, substantially foolproof operation, whereby the screen can be set up or folded for storage without danger of the parts becoming separated or jammed. Another principal advantage resides in the simple expedient by which the shape of the screen can be varied as desired by simply shifting one element of the stand assembly.

Further advantages are to be found in the simple combination of stand elements whereby operation of the stand is accomplished from a central position with all parts within easy reach of the operator; and in the arrangement whereby inadvertent separation of the telescoping members, durings extension, is automatically prevented.

Still further advantages are to be found in the simplified construction of the parts comprising the stand assembly whereby standardization of the several elements is obtained and whereby the device can be quickly and easily put together without special handling or costly assembly operations.

Although but one specific embodiment of this invention is herein shown and described, it will be understood that details of the construction shown may be altered or omitted without departing from the spirit of this invention as defined by the following claims.

We claim:

1. In a collapsible picture screen support, the combination with a plurality of extensible telescoping members, a base to hold said members upright, and releasable lock pins on said members for holding said members in predetermined positions of extension relative to each other, of releasable stop means associated with one member of each relatively sliding pair of said telescoping members for interlocking said pair of members automatically at the maximum safe position of extension of said pair of members, said stop means comprising a spring actuated pawl on one member normally urged toward the other member, and said other member having an aperture to receive said pawl when at its maximum position of extension, said pawl being adapted to interlock said members against relative movement in the direction of extension only.

2. In a collapsible picture screen support, the combination with a pair of extensible telescoping members, a base to hold said members upright, and a releasable lock pin on one of said members for holding said members in predetermined positions of extension relative to each other, of an automatic releasable stop means for holding said members against movement in the direction of extension when said members are at the maximum safe position of extension, said stop means comprising a spring actuated pawl on one member adjacent the telescoping end thereof and normally urged toward the other member, and said other member having an aperture therein engageable by said pawl when said members are fully extended, said pawl being adapted to stop relative movement of said members in the direction of extension only.

3. A picture screen support assembly comprising a bottom tube, a center member telescoped into said bottom tube and projecting from the upper end thereof, a top tube telescoping over the projecting portion of said center member, releasable lock means on said bottom tube and top tube respectively engageable with said center member to hold said top tube and center member in predetermined positions of extension, a rider comprising a body slidably fitted onto said center member below said top tube, releasable lock means on said rider for holding said rider at predetermined positions along said center member, a screen casing pivotally mounted intermediate its ends on said rider, the axis of the pivot being normal to said rider, said casing having a picture screen rolled therein and a top slat for said screen, a fixed pin on said top slat excentrically positioned relatively to the pivot connection between said casing and said rider and projecting from said slat toward said rider, and means on said rider engaging and holding said pin when said screen casing is rotated to a position parallel with the telescoping sections of said screen support.

4. A picture screen support assembly comprising a bottom tube, a center member telescoped into said bottom tube, a top tube telescoping over said center member, releasable lock means on said bottom tube and top tube respectively engageable with said center member for holding said top tube and center member in predetermined positions of extension, a rider comprising a body slidably fitted onto said center member below said top tube, a screen casing mounted on said rider, lock means on said rider for holding said rider at predetermined positions along said center member, and a pair of outwardly acting spring actuated stop latches disposed one adjacent the upper end of said center member and one adjacent the lower end of said center member, said bottom tube having an aperture in its side wall adjacent its upper end engageable by the lower stop latch of said center member, and said top tube having an aperture adjacent its lower end engageable by the upper stop latch of said center member, said stop latches limiting the movement of said telescoping members relative to each other in the direction of extension only.

5. A collapsible picture screen support comprising a base having a bottom tube extending upwardly therefrom, a center member of greater length than said bottom tube slidably telescoped into said bottom tube, a rider slidably mounted on said center member above said bottom tube, said rider having a screen casing mounted thereon, a top tube slidably telescoped over said center member, releasable lock means on each said bottom tube and top tube engaging said center member at predetermined positions of extension of the telescoping parts, and releasable lock means on said rider for holding said rider at predetermined positions along said center tube.

6. A collapsible picture screen support comprising a base having a bottom tube extending upwardly therefrom, a center member of greater length than said bottom tube slidably telescoped into said bottom tube, a rider slidably mounted on said center member above said bottom tube, said rider having a screen casing mounted thereon, a top tube slidably telescoped over said center member above said rider, releasable lock means on each said bottom tube and top tube engaging said center member at predetermined positions of extension of the telescoping parts and locking said telescoping parts in extended position, spring actuated latches acting between said telescoping parts and limiting the maximum extension only of said upper tube and said center member respectively, and releasable lock means mounted on said rider and coacting with said center tube to hold said rider at predetermined positions therealong.

7. A collapsible picture screen support comprising a base having a bottom tube extending upwardly therefrom, a center member slidably telescoped into said bottom tube and being of greater length than said bottom tube, a rider slidably mounted on said center member above said bottom tube, said rider having a screen casing mounted thereon, a top tube slidably telescoped over said center member above said rider, releasable lock means on each said bottom tube and top tube engaging said center member and holding said top tube and center member at predetermined positions of extension relative to said bottom tube, automatic stop latches on said center member adjacent the upper and lower ends thereof limiting the maximum extension of said top tube and said center member respectively, and releasable lock means on said rider to hold said rider at predetermined positions along said center tube, said stop latches each having a spring actuated pawl normally engaging the inner side wall of the top tube and bottom tube respectively, and said top tube and bottom tube each having a side wall opening located to register with and receive the respective stop latch pawl at the position of maximum safe extension of said top tube and center member respectively.

JOHN T. HECK.
LEO J. DU MAIS.
CURTIS O. TALBOT.

REFERENCES CITED

The following references are of record in the file of this patent:

UNITED STATES PATENTS

| Number | Name | Date |
| --- | --- | --- |
| 2,042,443 | Buckstone | May 26, 1936 |
| 2,355,799 | Heck | Aug. 15, 1944 |
| 2,361,119 | Owens | Oct. 24, 1944 |
| 2,386,450 | Eller | Oct. 9, 1945 |